June 2, 1964   M. S. QUESENBERRY, JR   3,135,464
GUIDE RULE
Filed March 22, 1962

INVENTOR
M.S. Quesenberry, Jr.

BY Mason, Fenwick & Lawrence
ATTORNEYS

United States Patent Office 3,135,464
Patented June 2, 1964

3,135,464
GUIDE RULE
Milford S. Quesenberry, Jr., 218 Proctor St.,
Big Stone Gap, Va.
Filed Mar. 22, 1962, Ser. No. 181,653
3 Claims. (Cl. 235—70)

This invention relates to guide rules, and particularly to such devices which can be used to ascertain the proper set up of a prefabricating jig from drawings showing the structure to be prefabricated.

In applicant's co-pending application Serial No. 815,451, filed May 25, 1959, now Patent No. 3,036,609, entitled Jig, there is disclosed a system for transferring information from a drawing to a jig whereby required panels may be constructed on the jig for assembly to provide the desired structure. The jig also is disclosed in detail.

The system proposed for use with the jig contemplates transposing all wall, both interior and exterior, measurements into inches, and locating all structural elements, studs, window frames, door frames, etc. by their distance in inches from one wall corner. All measurements are to stud, etc. centers because the jig is arranged to receive stud supports by a center mounting. This will locate the center lines of all vertical structural members. The supports to be used on the jig will be for single, double, or triple stud, partition T, etc. The various support elements will be given different colors in accordance with a color code.

The jig disclosed in the above mentioned application is in the form of a large table having a plurality of parallel grooves, with the bottoms of the grooves apertured to receive the stud supports. The apertures are arranged according to a predetermined spacing, and a scale is placed along each groove. The scales all have a zero marking at a predetermined zero-line along one of the longitudinal edges of the table normal to the direction of the grooves. The measurements obtained through use of the above-described system are used to determine the positions of the stud supports along the apertured grooves.

In view of the fact that the distances of structural members are set out in inches from the selected corner of the building, all panels except the first one adjacent the corner will have their measurements expressed in total inches which exceed the jig scales. This means that mental subtraction of preceding panel accumulations must be made to obtain a reading which can be applied to the jig as subsequent panels, after the first, are to be constructed.

The general object of the present invention is to provide a guide rule which will permit prior layout of stud, etc. locations in accordance with their cumulative distances from the selected corner, and present instant visual indication of the proper setting of the stud supports on the jig.

A more specific object is the provision of a guide rule of this type wherein the accumulated distances of the various elements are, or may be, referenced to the jig scale, irrespective of the amount of accumulation.

A further object is to provide a guide rule which will include one or more replicas of the jig scale and provide for seating and holding markers representing the various supports used on the jig in their proper positions relative to the jig scale replica so that a pattern is provided for use in setting up the jig.

Another object is to provide a guide rule which can be used to plan the locations of various pieces of equipment with reference to their locations along a wall space.

Other objects of the invention will become apparent from the following description of one practical embodiment thereof, when taken in conjunction with the drawings which accompany, and form part of, this specification.

Figure 1:
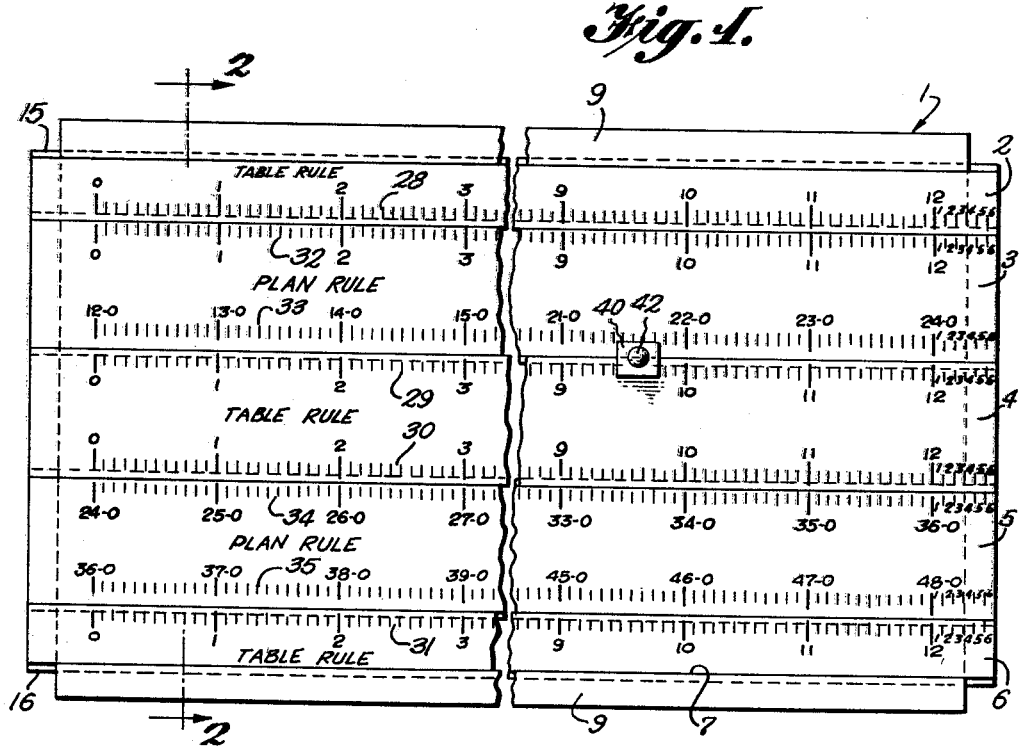
FIGURE 1 is a plan view of a guide rule embodying the principles of the present invention.
Figure 2:
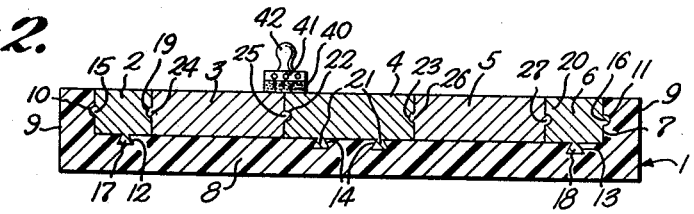
FIGURE 2 is a transverse section through the rule, taken on the line 2—2 of FIGURE 1.
Figure 3:
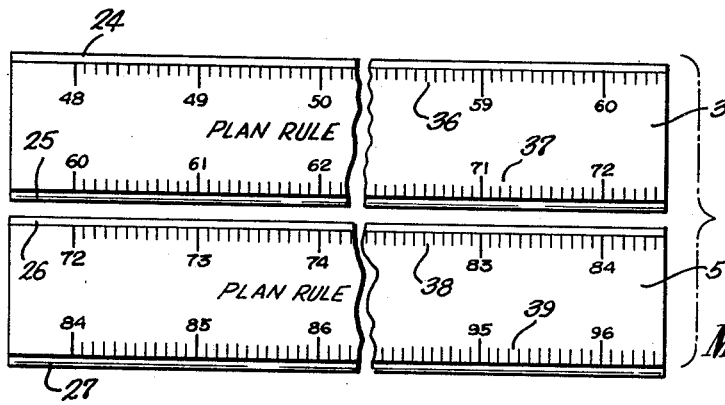
FIGURE 3 is a view of the slides of the rule removed from the base frame and inverted to show the reverse side.

In general, the invention is concerned with a guide rule which will have one or more replicas of a scale of a layout board, or jig, and one or more slidable members which carry scale markings totalling an excess over the table scale for selective placement adjacent the table scale to indicate successive locations on the table scale of elements taken from a continuous plan.

While the guide rule may take the form of a single replica of the layout table, or jig, scale with a continuous plan scale movable to successive positions relative to the table scale, it has been illustrated as having a plurality of table scales, with a plurality of plan elements representing successive lengths of the plan scale, each positionable relative to one of the table scales.

Referring to the drawings in detail, there is shown a guide rule which consists of a base frame 1 carrying a plurality of slide elements 2, 3, 4, 5 and 6. The slides are arranged for sliding movement relative to the frame and to each other. Slides 2, 4 and 6 are designated table slides, and slides 3 and 5 are termed plan slides.

The base frame is an elongated member which has a wide central recess 7 to receive the slides 2 to 6, inclusive. This provides a bottom 8 and sides 9. Arcuate grooves 10 and 11 are formed in the inner walls of the sides, extending the full lengths thereof, and dovetail grooves 12 and 13 are formed in the top surface of the bottom of the frame. Two additional parallel dovetail grooves 14 are provided in the bottom of the recess 7.

Table slides 2 and 6 are identical structurally with the exception of the reversal of their scales as will be described. Each is an elongated member having a rib along one side edge, as shown at 15 and 16 respectively. Slide 2 has a dovetail rib 17 on its base, and slide 6 has a similar rib 18. The ribs 15 and 16 will slide freely in grooves 10 and 11, and ribs 17 and 18 will slide within grooves 12 and 13, so that slides 2 and 6 will be slidable relative to the base frame, and at the same time, keyed to the frame. It will be noted that slides 2 and 6 have grooves 19 and 20 in their respective sides opposite the sides having the ribs 15 and 16.

Table slide 4 may be somewhat wider than slides 2 and 6, and it has two dovetail ribs 21 on its underside for sliding engagement in the grooves 14 to key this slide to the base frame. Slide 4 has grooves 22 and 23 in its opposite side edges, the grooves being similar to the grooves 19 and 20 in the side edges of the slides 2 and 6.

Plan slides 3 and 5 are similar to slide 4 in size, but they are not keyed to the base frame. Instead, these slides are arranged for longitudinal movement by having side ribs 24 and 25 and 26 and 27, respectively, for sliding engagement in the grooves 19 and 22 and 23 and 20.

It is preferable to have the several slides longer than the base frame so that they project beyond the base frame edges to provide extensions which may be grasped easily to facilitate sliding movement of the slide members.

Slides 2, 4 and 6 will have similar scales along their edges. In each case, the scale will be engraved, or marked, along the slide edge. With slides 2 and 6, the scale will be along the edges adjacent slides 3 and 5, and slide 4 will have scales along both longitudinal edges so that there will be a table scale adjacent each side of the plan slides 3 and 5. The scales of slides 2, 4 and 6 are shown graduated from a zero marking at the left to twelve feet, six inches at the right. This will embrace all of the convenient panel widths, and the jig table scales will fall within these limits. These scales are indicated at 28 on slide 2, at 29 and 30 on slide 4, and at 31 on slide 6. These scales, in most instances will not be full size, but reduced to provide a twelve foot, six inch representation on a guide which is of a practical length for easy handling.

Plan slides 3 and 5 will have a scale along each longitudinal edge of faces of the slides. This will provide eight scales on the two slides. Slide 3 will have a scale 32 along one edge, the scale being graduated from zero to twelve feet, six inches, and a scale 33 on the opposite edge of the same face, graduated from twelve feet to twenty-four feet, six inches. Slide 5 will have the scales 34 and 35 on opposite sides of one face, with the scale 34 being graduated from twenty-four feet to thirty-six feet, six inches, and the scale 35 from thirty-six feet to forty-eight feet, six inches. The opposite faces of slides 3 and 5 will bear the scales 36, 37, 38 and 39, respectively. Scale 36 is graduated from forty-eight feet to sixty feet, six inches, the scale 37 from sixty feet to seventy-two feet, six inches, the scale 38 from seventy-two feet to eighty-four feet, six inches, and scale 39 from eighty-four feet to ninety-six feet, six inches. Thus, the eight scales of the two slides 3 and 5 will provide for continuous graduations from zero to ninety-six feet, so that a plan calling for any width up to ninety-six feet can be divided into panels and the panel frame element positions on the jig ascertained.

In using the guide rule, the various elements will be assembled as shown. By consulting the plan, the location of the selected corner from which all measurements are taken will be ascertained. With slides 2 and 3 arranged so that their scales are coincident, a marker of the type shown at 40 is placed bridging the edges of the two slides at their zero markings. This will indicate the position of the first frame member on the stud.

It is contemplated that the slides will be of metal and marker 40 will be a magnet, or have a magnet attached to it, so that markers will hold their positions on the slides. If the markers are to represent frame supports, they may be marked, as at 41, by any similar code to indicate what type of unit is desired. The markers may be made to represent fixtures of various kinds, and, in that event, they may take the form and scaled size of the fixtures they represent. As the markers will be small, they may be provided with handles 42 for ease in placing them where desired.

After the corner post is located, the next stud, or frame member, is found and its position marked. This is continued until all the frame members of the first panel are located.

If six foot panels are being constructed, the first member of the second panel will be at the six foot mark on the plan scale 3. Normally, since all panels start at the zero position on the jig, the six foot graduation on scale 32 of slide 3 will be brought to the zero marking of scale 28 of the table slide 2. Markings made on scale 32 from the plan will then intersect the proper graduation on scale 28 to show the correct jig positions for the elements of the second panel.

The above procedure can be continued by using scale 33 with scale 29, scale 34 with scale 30, etc. as the accumulated distances of the panels to be marked come within the ranges of these several scales. If the plan goes beyond forty-eight feet, the slides 3 and 5 may be drawn out, reversed and reinserted to bring scales 36, 37, 38 and 39 into position for using.

It will be evident that the use of a plurality of table rules, or slides, and a plurality of plan slides, will enable the production of a small guide of convenient arrangement. The same result could be obtained with but one table slide and a plurality of plan slides for use in successions with it, or one continuous plan slide could be used.

While in the above one practical embodiment of the invention has been shown and described, it will be apparent that the details of structure shown and described are merely by way of example, and the invention could take other forms within the scope of the appended claims.

What is claimed is:

1. A guide rule for use with a plan and a layout table for transposing distance information from the plan to location positions relative to the layout table comprising, a base frame, a plurality of table slides slidably mounted in the base frame in spaced parallel relation, plan slides mounted in the base frame for sliding movement intermediate the table slides, the table slides having similar scales along the edges thereof adjacent each plan slide, each scale being graduated from zero to a predetermined maximum in accordance with positions on the layout table, and the plan slides having scales thereon along their edges adjacent each table slide, the plan slide scales being cumulative and graduated from zero to a predetermined maximum, with the cumulative scale being divided equally among the several plan slides.

2. A guide rule as claimed in claim 1 wherein, the table slides are keyed to the base frame and the plan slides are slidably carried by adjacent table slides.

3. A guide rule for use with a plan and a layout table for transposing distance information from the plan to location positions relative to the layout table comprising, a base frame, a table slidably mounted in the base frame and having a scale thereon graduated from zero to a predetermined maximum in accordance with positions on the layout table, a plan slide slidably mounted in the base frame and slidable relative to the table slide and having a scale thereon graduated in accordance with distances on the plan from a given datum point, positioning markers intersecting the scale on the table slide and plan slide to indicate positions on the table slide corresponding to selected positions on the plan slide, and the table and plan slides are of metal and the markers carry magnets.

References Cited in the file of this patent

UNITED STATES PATENTS

| | | |
|---|---|---|
| 1,395,489 | Glover | Nov. 1, 1921 |
| 2,034,027 | Decary et al. | Mar. 7, 1936 |
| 2,585,924 | Freedman | Feb. 19, 1955 |
| 2,951,703 | Arnold | Sept. 6, 1960 |
| 2,977,680 | Halverson | Apr. 4, 1961 |

FOREIGN PATENTS

| | | |
|---|---|---|
| 1,183,923 | France | July 15, 1959 |